Figure 17:
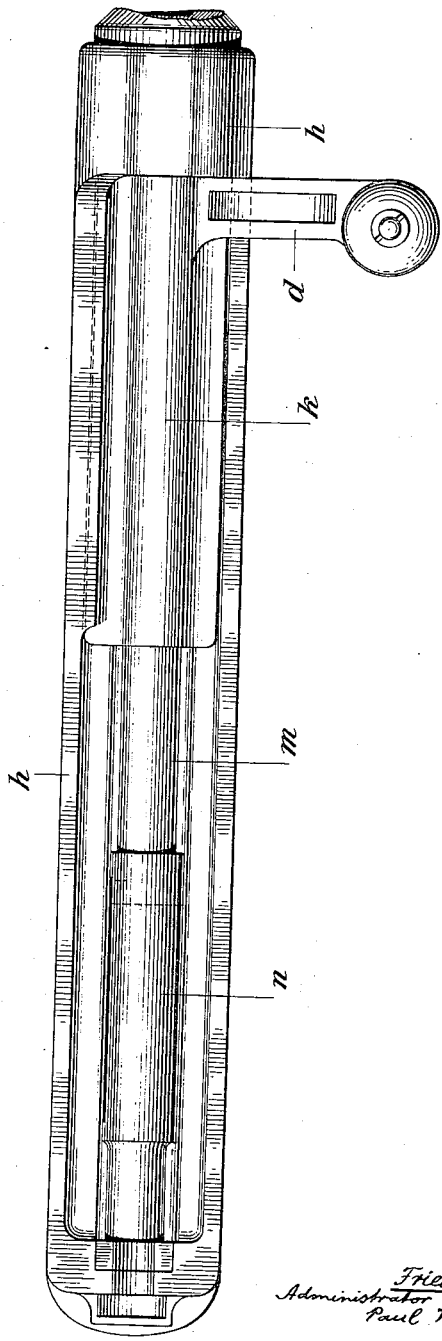

P. MAUSER, DEC'D.
F. EICHHORN, ADMINISTRATOR.
ROTATABLE LUG BOLT FIREARM.
APPLICATION FILED DEC. 3, 1914.
1,180,785.
Patented Apr. 25, 1916.
6 SHEETS—SHEET 1.
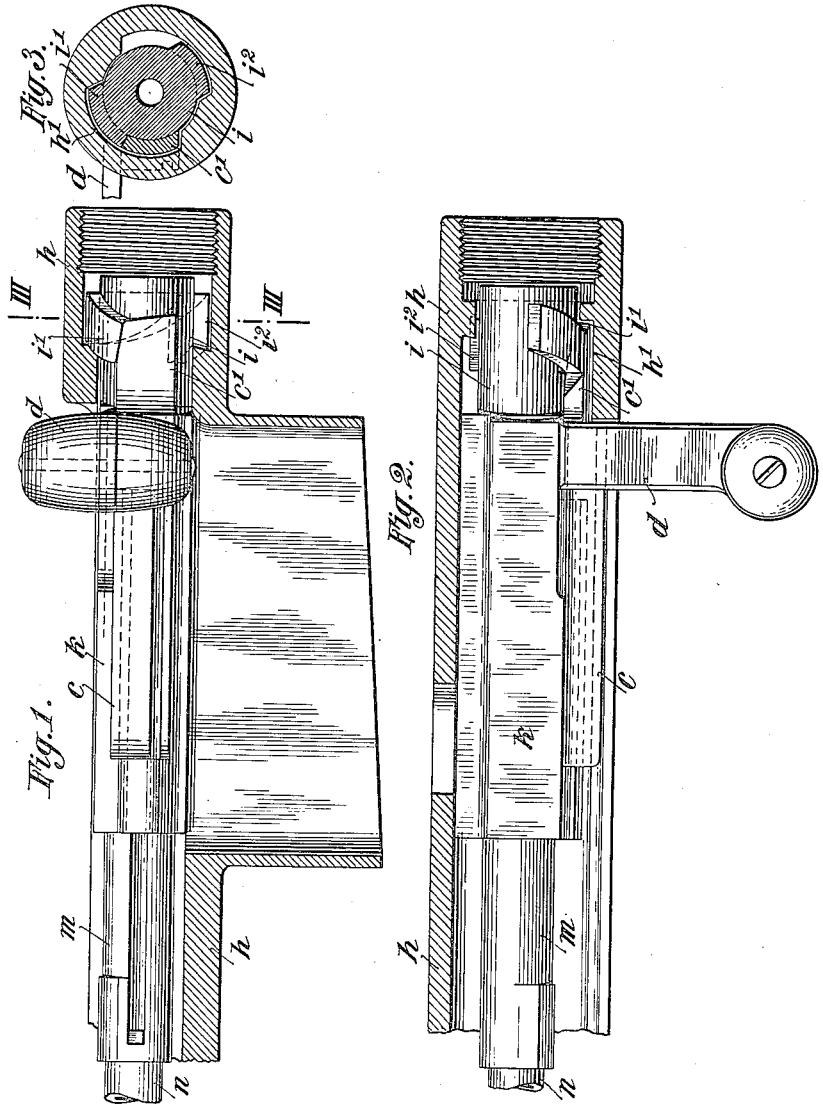

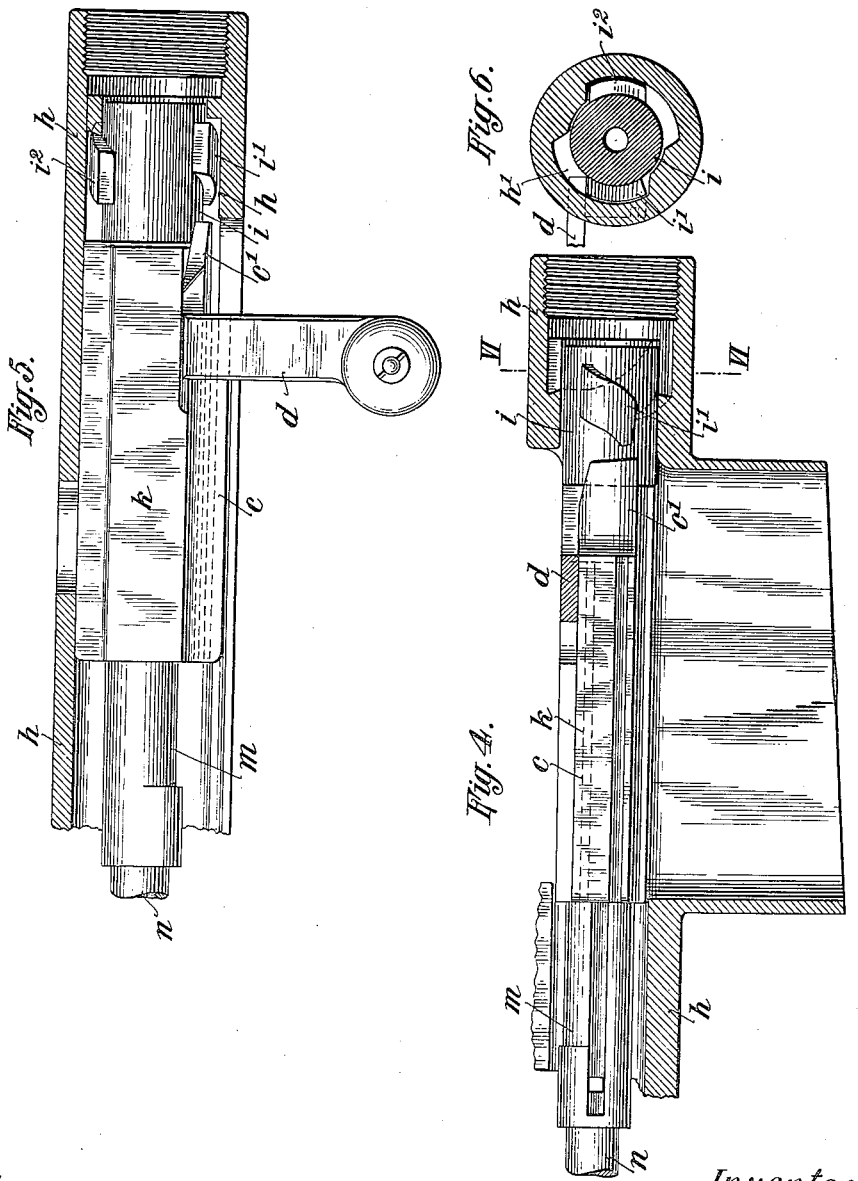

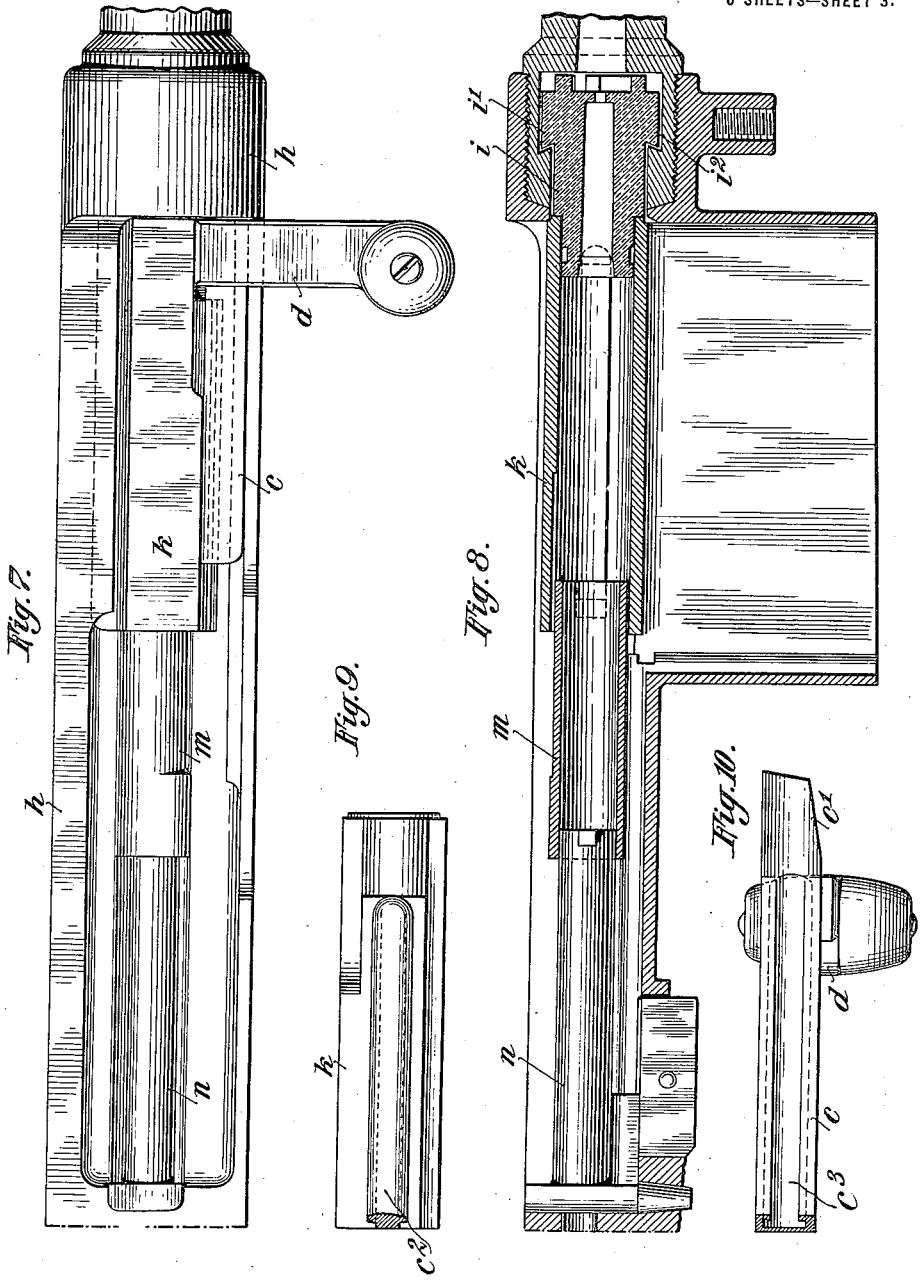

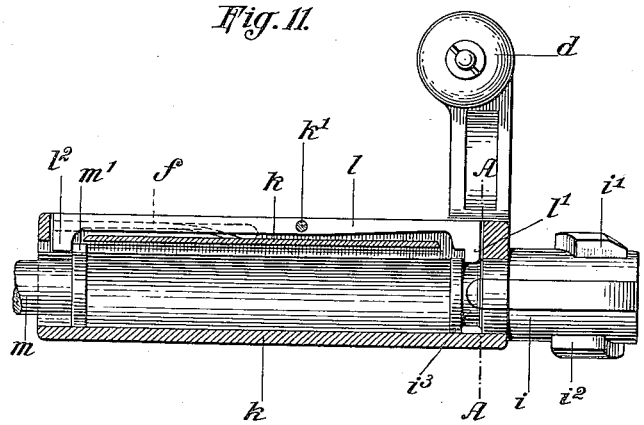
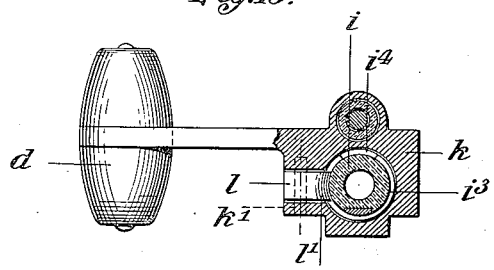
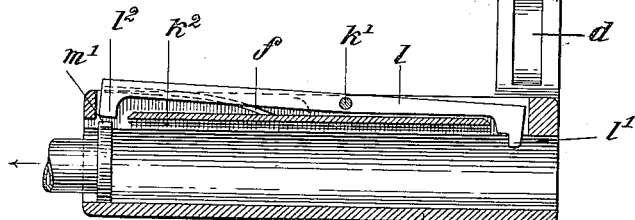

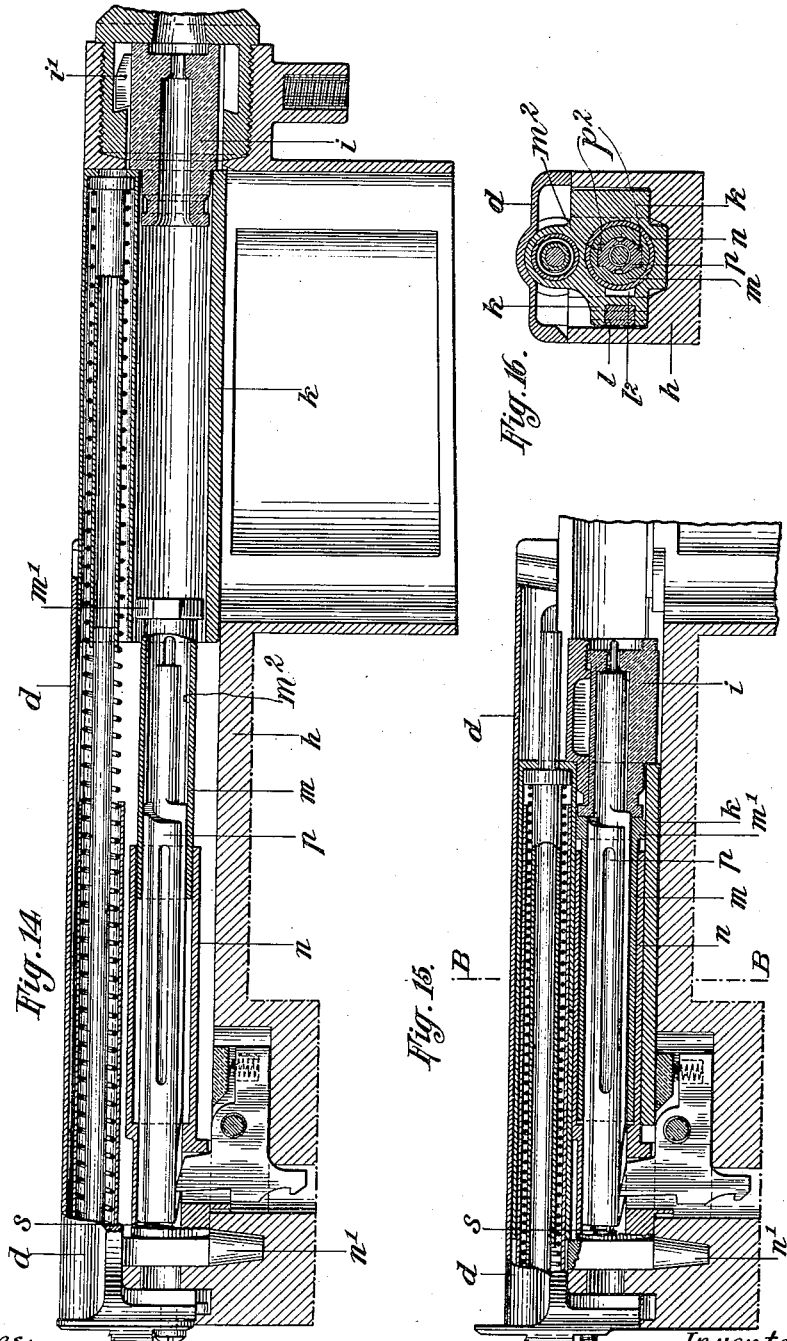

P. MAUSER, DEC'D.
F. EICHHORN, ADMINISTRATOR.
ROTATABLE LUG BOLT FIREARM.
APPLICATION FILED DEC. 3, 1914.

1,180,785.

Patented Apr. 25, 1916.
6 SHEETS—SHEET 6.

Witnesses:
René Muine
Fred White

Inventor:
Friedrich Eichhorn,
Administrator of the Estate of
Paul Mauser, deceased,
By Attorneys,

UNITED STATES PATENT OFFICE.

PAUL MAUSER, DECEASED, LATE OF OBERNDORF-ON-THE-NECKAR, GERMANY, BY FRIEDRICH EICHHORN, ADMINISTRATOR, OF OBERNDORF-ON-THE-NECKAR, GERMANY, ASSIGNOR TO WAFFENFABRIK MAUSER AKTIENGESELLSCHAFT, OF OBERNDORF-ON-THE-NECKAR, GERMANY, A CORPORATION OF GERMANY.

ROTATABLE-LUG-BOLT FIREARM.

1,180,785.  Specification of Letters Patent.  Patented Apr. 25, 1916.

Application filed December 3, 1914.  Serial No. 875,349.

*To all whom it may concern:*

Be it known that PAUL MAUSER, deceased, late a subject of the King of Wurttemberg, and residing at Oberndorf-on-the-Neckar, in the Kingdom of Wurttemberg, Germany, invented certain new and useful Improvements in Rotatable-Lug-Bolt Firearms, of which the following is a specification.

The invention relates to fire arms and particularly to the construction of breech mechanism for hand loaders.

The breech bolt carrier, movable only in a straight line, is provided with a rotatable breech bolt the lugs of which, on the closing and opening of the breech, automatically screw in and out of the corresponding grooves of the barrel sleeve, the lugs being beveled for effecting such automatic rotation. In combination with this breech bolt there is arranged a handle bar carried on the bolt carrier, a sort of pull-and-push rod, which through its forward movement effects the rotation of the breech bolt, and locks the lugs in the grooves in the barrel sleeve. On the drawing back, on the other hand, if the breech is to be opened, the handle-bar again releases the lug and this brings the breech mechanism by the rotation of the breech bolt into the open position.

In the drawing there is shown such a breech mechanism in its main details in Figures 1 to 10, and Fig. 1 shows in a vertical longitudinal section partially in elevation the situation of the parts of the breech; Fig. 2 is a corresponding horizontal sectional view; Fig. 3 a vertical cross-section along the line III—III of Fig. 1; Fig. 4 shows in a vertical longitudinal section the bolt carrier slightly retracted and the bolt in unlocked position; Fig. 5 is a corresponding horizontal sectional view, and Fig. 6 a vertical cross-section along the line VI—VI of Fig. 4. Figs. 7 and 8 show in plan and in vertical longitudinal section the collective arrangement of the breech portions in the casing and with the breech closed. Fig. 9 shows the bolt carrier alone with the handle rod taken off, and Fig. 10 the handle rod in side elevation. Figs. 11 to 13 inclusive illustrate additional features of the invention; Fig. 11 illustrating a horizontal section through the bolt carrier $k$ with the breech bolt inserted therein; Fig. 12 showing a similar section with the breech bolt removed, and Fig. 13 illustrating a cross section along the line $k$—$k$ of Fig. 11. Further features of the invention are illustrated in Figs. 14 to 17 inclusive; Fig. 14 illustrating in vertical longitudinal section the breech mechanism in the locked position; Fig. 15 illustrating in vertical longitudinal section the breech mechanism in opened position; Fig. 16 showing a vertical cross section along the line B—B of Fig. 15, and Fig. 17 illustrating a plan of the breech mechanism in the locked position with the cover and locking spring removed.

The breech mechanism consists of the casing $h$ carrying the barrel in its front portion and closed at its rear portion preferably by a cover; of the bolt carrier $k$ executing in its casing its linear closing and opening movements; of the breech bolt $i$ rotatably seated in the bolt carrier $k$ and carrying the locking lugs $i'$ $i^2$; and of the casing receiving the striking and firing device inserted in the rear portion of the casing $h$, which casing for the firing device is connected with the bolt carrier $k$ by an intermediate sleeve $m$.

According to the invention there is arranged laterally on the bolt carrier $k$ a displaceable strip or rod $c$, which at the same time forms the actuating and locking device for the breech bolt. For this purpose the strip or rod $c$, provided with a handle $d$, is displaceably held on the bolt carrier by interengaging-means, such as the tongue and undercut grooves $c'$, $c^2$ (Figs. 9 and 10). rearward movement being limited by an internal lug. The breech bolt $i$ is inserted in the bolt carrier, is freely rotatable therein, and its spiral lugs $i'$ $i^2$ have such a pitch that on the linear displacement of the bolt carrier (for the purpose of opening and closing the breech) they automatically rotate in the corresponding grooves $h'$ of the barrel case. On closing the breech the handle strip $c$ is pushed so far forward that the front end thereof hits against the lug that is turned toward it, and thereby carries the breech bolt $i$ together with the bolt carrier $k$ forward until both parts come into the locking position. If the breech bolt $i$ has carried out its rotation so that the lugs are in the corresponding grooves $h'$ of the barrel case in the locking position, then the rod $c$ has freedom of movement forward in such a way that it, (by further movement of its beveled end $c'$) can get under the respective lug $i'$ and therefore support it. Hereby the breech bolt $i$ is locked against rotation in the locked position, and thereby during the shooting the locking position is maintained against the effect of the gas pressure. On opening of the breech the rod $c$ is drawn back, whereby in the first place the locking of the lug is relieved, and then on further backward movement the breech bolt $i$ is, with its lugs, screwed out of the grooves of the barrel sleeve and the bolt carrier $k$ brought into the open position.

For the sake of better locking it is advisable to bevel off (with a bevel falling off inward) both the under edge of the lug to be supported and also the upper edge of the rod end $c'$. As to the locking members, it is advisable to bevel off backward the rear contact surfaces of the lugs and the corresponding abutting pieces in the barrel sleeve.

In the construction according to Figs. 7 and 8, the barrel sleeve carrying the locking grooves is constructed as a special portion which also contains the cartridge chamber, in which case the contact surfaces between the bolt of the lock casing and this special sleeve piece are maintained running out into the shape of a cone.

A further characteristic of the invention consists in the fact that the breech bolt $i$ is fastened to the bolt carrier $k$ by a pawl, rotatably located on the bolt carrier, which lies flush with the outer surface of the bolt carrier $k$, when the breech bolt is inserted, and which projects outwardly with its rear end under the effect of a spring, when the breech bolt is missing. Thereby there is attained the result that on a setting up of the breech mechanism the lack of the breech bolt immediately becomes noticeable through the projecting forward of the pawl, and prevents the insertion of the breech mechanism into the breech casing. In the drawing, this portion of the invention is illustrated in Figs. 11 to 13. The breech bolt $i$ is provided at the rear end with a ring groove $i^3$ in which engages the front claw-like end $l'$ of the holding pawl $l$ which is journaled on the bolt carrier $k$ rotatable about the pin $k'$. For the purpose of inserting the lock bolt into the breech piece the flange at the rear of the groove $i^3$ of the breech bolt, is provided with an opening $i^4$ (Fig. 13) through which the claw $l'$ of the holding pawl can enter the ring groove $i^3$ of the breech bolt. As long as the breech bolt is not inserted in the bolt carrier the rear arm of the holding pawl is pressed outward by means of a spring $f$, so that this arm of the holding pawl projects beyond the outer surface of the bolt carrier $k$. If on the other hand the breech bolt is inserted into the bolt carrier, then the rear arm of the pawl is held against the pressure of the spring $f$ by means of the claw $l'$ resting at the bottom against the groove $i^3$ in such manner that the outer surface of the holding pawl lies flush with the outer surface of the bolt carrier $k$ (Fig. 11). The breech mechanism can therefore only be inserted into the casing when the breech bolt $i$ is inserted into the bolt carrier, since otherwise the projecting end of the holding pawl hinders the insertion by hitting against the wall of the casing. Through this means there is avoided the circumstance that on setting up of the gun the breech bolt is forgotten, which in accordance with experience in weapons with removable breech bolts often occurs. The holding pawl $l$ can also at the same time be employed for the coupling of the bolt carrier with a sleeve seated in the locking casing and receiving the firing pin, or with an intermediate sleeve connecting this first-mentioned sleeve with the bolt carrier, said intermediate sleeve being displaceable telescopically as regards both of them. For this purpose the rear arm of the holding pawl $l$ is also shaped as a claw $l^2$ which claw $l^2$, when the bolt carrier $k$ engages with the pin $m'$ of the sleeve $m$ (or the intermediate sleeve) serving to guide the bolt carrier in the groove $k^2$, coöperates in such a way that the sleeve $m$ is maintained fast in the bolt carrier $k$. The taking apart of the breech mechanism is brought about in such a way that in the first place the breech bolt $i$ is turned into the position in which the claw $l'$ of the holding pawl stands opposite the opening $i^4$ on the breech bolt, whereupon the breech bolt can be drawn directly out of the bolt carrier $k$. As soon as this has happened the rear claw $l^2$ of the holding pawl under the effect of the spring $f$ springs outwardly, and thereby releases the pin $m'$ of the sleeve $m$, which now also can be drawn out of the bolt carrier.

A further characteristic of the invention consists in the fact that in the sleeve containing the firing pin and its spring, (the said sleeve having the shape of a casing and being firmly seated in the breech casing) there is arranged telescopically a sleeve, serving for guiding the firing pin, which on the opening and closing of the breech is shoved in and out by means of the bolt carrier. In the drawing, this part of the invention is set forth by way of example in Figs. 14 to 17. The firing pin $p$ and its spring $s$ are arranged in the sleeve-like casing $n$ which latter by means of a wedge pin $n'$ is seated in the casing $h$ in such way that, after removing the cover from the casing $h$, it can be taken out upwardly, but it is held firm against displacement in the longitudinal direction of the weapon. With the casing $n$, there is connected a sleeve $m$ which is insertible telescopically into the casing $n$ and is guided with its front flange end $m'$ in the bolt carrier $k$. The sleeve $m$ is guided in the casing $n$ by the engagement of a pin in a longitudinal groove of the casing $n$. When the breech is opened (Fig. 15) the sleeve $m$ is shoved into the casing $n$, and on the closing of the breech it is carried along with the forward movement of the bolt carrier $k$ by means of the claw $l^2$ of the pawl $l$ rotatably mounted on the bolt carrier, the said claw engaging behind a pin on the flange $m'$ of the intermediate sleeve $m$. When the breech mechanism is in the closed position (Fig. 14) the sleeve $m$ is completely drawn out, so that when the firing pin is thrown forward the sleeve $m$ can serve as a guide therefor, the firing pin $p$ having two ribs $p^2$ corresponding with the longitudinal grooves $m^2$ of the sleeve $m$. On opening the breech the sleeve $m$ at first remains in the drawn-out position, since the pin on the flange $m'$ slides in a longitudinal groove of the bolt carrier $k$ until the rear surface of the breech bolt $i$ hits against the front surface of the sleeve $m$, and, on further regression, the bolt carrier takes the sleeve $m$ with it and pushes it into the casing $n$. By the arrangement of such intermediate sleeve the advantage is attained that the bolt carrier can be made shorter, and in spite of that there is a good guide assured for the firing pin.

The invention is applicable to automatic as well as semi-automatic, or non-automatic fire arms.

What is claimed is:

1. A breech mechanism for fire arms, comprising a rotary bolt having locking lugs thereon, a bolt carrier, and means for locking said bolt in position to close the breech, said means comprising a hand-operated part adapted to be moved into position with relation to said locking lugs to lock said rotary bolt against rotation.

2. A breech mechanism for fire arms, comprising a rotary bolt having locking lugs thereon, a bolt carrier, and means for locking said bolt in position to close the breech, said means comprising a hand-operated part slidably mounted on said bolt carrier and adapted to be moved into position with relation to said locking lugs to lock said rotary bolt against rotation.

3. A breech mechanism for fire arms, comprising a casing having inclined grooves, a rotary bolt having locking lugs thereon, a bolt carrier, and means for locking said bolt in position to close the breech, said means comprising a hand-operated part adapted to be moved into position with relation to said locking lugs to lock said bolt against rotation in said grooves, the incline of said grooves being such that said bolt may turn therein when the lugs thereon pass along said grooves.

4. A breech mechanism for fire arms, comprising a rotary bolt having locking lugs thereon, a bolt carrier, and means for connecting said bolt to said bolt carrier, said means comprising a pawl on said bolt carrier adapted to engage said bolt.

5. A breech mechanism for fire arms, comprising a rotary bolt having locking lugs thereon, a bolt carrier, and means for connecting said bolt to said bolt carrier, said means comprising a pawl on said bolt carrier adapted to engage said bolt, said pawl being adapted to occupy a position which interferes with the proper action of said bolt carrier in the gun, said rotary breech bolt, when in position, preventing said pawl from occupying said interfering position.

6. A breech mechanism for fire arms, comprising a rotary bolt having locking lugs thereon, a bolt carrier, and means for connecting said bolt to said bolt carrier, said means comprising a pawl on said bolt carrier adapted to engage said bolt, and a spring adapted to press on said pawl, said spring being adapted to press on said pawl to cause said pawl to occupy a position which interferes with the proper action of said bolt carrier in the gun, said rotary bolt, when in position, preventing said spring pressing said pawl into said interfering position.

7. A breech mechanism for fire arms, comprising a casing, a rotary bolt, a bolt carrier, and a telescopic sleeve between said bolt carrier and casing, and a pawl on said bolt carrier adapted to connect said bolt and said sleeve to said bolt carrier.

8. A breech mechanism for fire arms, comprising a casing, a breech piece, a firing pin, and a telescopic sleeve between said breech piece and casing, said sleeve acting as a guide for said firing pin.

9. A breech mechanism for fire arms, comprising a casing, a breech piece, a firing pin, and a telescopic sleeve between said breech piece and said casing, said telescopic sleeve comprising a plurality of parts, telescoping on one another, and on the breech piece, said part of the telescopic sleeve contiguous to the breech piece acting as a guide for the firing pin.

10. A breech mechanism for fire arms, comprising a casing, a breech piece, a firing pin, and a telescopic sleeve between said breech piece and casing, said telescopic sleeve acting as a guide for said firing pin and having a pin-and-slot connection with said casing.

11. In a fire arm, the combination of a casing having inclined grooves therein, a rotatable breech bolt having locking lugs thereon, and a sliding part adapted to push said lugs into said grooves, and to lock said bolt in locking position.

12. In a fire arm, the combination of a casing having inclined grooves therein, a rotatable breech bolt having locking lugs thereon, and a sliding part having a handle thereon adapted to push said lugs into said grooves, and to lock said bolt in locking position.

13. In a fire arm, the combination of a rotatable breech bolt having locking lugs thereon, a breech chamber having beveled shoulders therein, a bolt carrier and a sliding part therein adapted to push said breech bolt against said beveled shoulders so that the locking lugs rotate into locking position, and to further move behind said locking lugs and lock the bolt in locking position.

14. In a fire arm, the combination of a breech bolt comprising a rotatable and a non-rotatable part, said rotatable part having locking lugs thereon, and a part carried by said non-rotatable part adapted to push against said rotatable part for advancing and rotating the same, and to move behind a lug when the rotatable part has been rotated into locking position for locking the same in such locking position.

15. In a fire arm, the combination of a breech bolt comprising a rotatable and a non-rotatable part, and means for connecting said parts together, said means comprising a pawl, said pawl being displaceable by said rotatable part of the breech bolt, said pawl, when not displaced by said rotatable part of the breech bolt, preventing insertion of the breech bolt in the fire arm.

16. In a fire arm, the combination of a breech bolt comprising a rotatable and a non-rotatable part, a sleeve and means for connecting said rotatable part of the breech bolt and said sleeve to said non-rotatable part, said means being displaceable by said rotatable part, said means in displaced position connecting said sleeve and non-rotatable part.

In witness whereof, I have hereunto signed my name in the presence of two subscribing witnesses.

FRIEDRICH EICHHORN,
*Administrator of the Estate of Paul Mauser, deceased.*

Witnesses:
 ERNEST ENTENMANN,
 FRIDA KLAIBER.